Dec. 15, 1942.  A. P. HELDENBRAND  2,305,079
PIPE THREAD CLEANER
Filed Sept. 10, 1938  3 Sheets-Sheet 1

Inventor
A. P. Heldenbrand,
By Barry & Cyr
Attorneys

Dec. 15, 1942.  A. P. HELDENBRAND  2,305,079
PIPE THREAD CLEANER
Filed Sept. 10, 1938  3 Sheets-Sheet 2
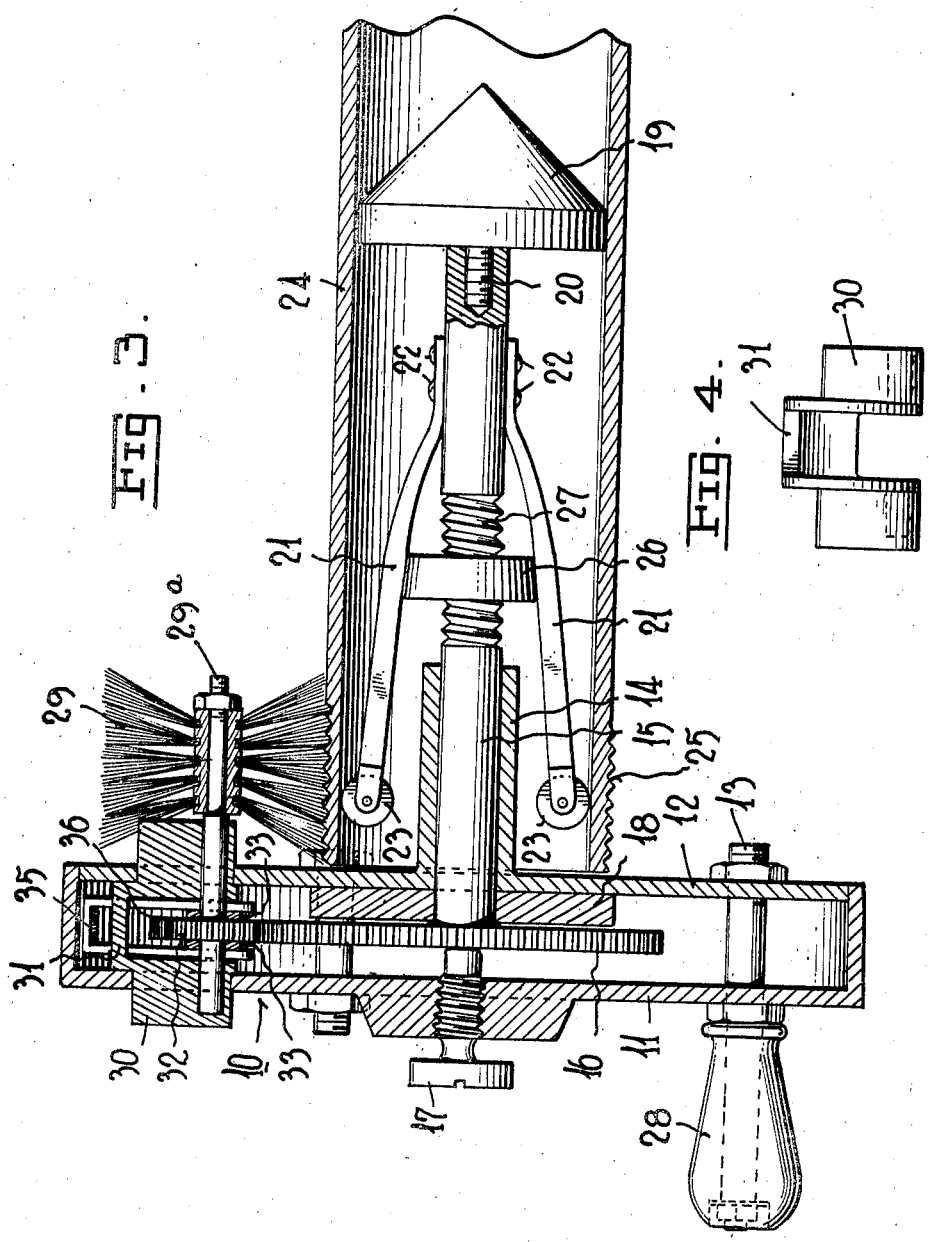
Inventor
A. P. Heldenbrand,
By Barry & Cyr
Attorneys Dec. 15, 1942.        A. P. HELDENBRAND        2,305,079
                      PIPE THREAD CLEANER
                    Filed Sept. 10, 1938        3 Sheets-Sheet 3

Inventor
A. P. Heldenbrand,
Barry & Cyr
Attorneys

Patented Dec. 15, 1942

2,305,079

UNITED STATES PATENT OFFICE 2,305,079

PIPE THREAD CLEANER

Arthur P. Heldenbrand, Tonkawa, Okla.

Application September 10, 1938, Serial No. 229,373

4 Claims. (Cl. 15—104.04)

This invention relates to improvements in thread cleaning apparatus, and more particularly to novel means for cleaning the external threads of pipes and the like.

In oil field drill pipe, tubing, casing and the like, varying in size from 1 inch to 8 inch, the threads become corroded when such pipes are used in wells during drilling or pumping operations. Therefore, the main object of this invention is to provide a thread cleaning apparatus capable of removing any debris deposited on the male threads of such pipe, whereby future coupling of the pipe may be facilitated.

Another object is to furnish an apparatus for this purpose, including adjustable elements to accommodate pipes of various sizes.

With the foregoing objects outlined and with other objects in view which will appear as the description proceeds, the invention consists in the novel features hereinafter described in detail, illustrated in the accompanying drawings, and more particularly pointed out in the appended claims.

In the drawings:

Fig. 3 is a sectional view taken on the line 3—3 of Fig. 1, and showing the means for attaching the thread cleaner to a pipe.

Fig. 4 is an elevation of one of the eccentric bearings used in the structure shown in Figs. 1 to 3 inclusive.

Figure 1:
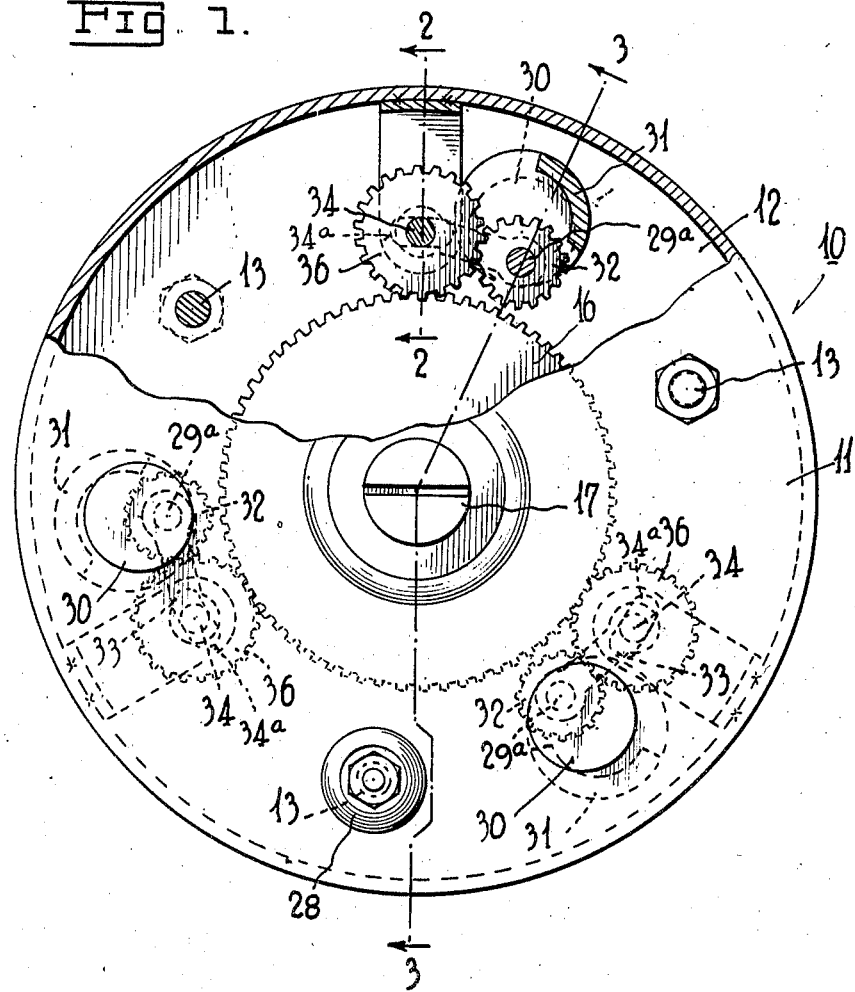
Fig. 1 is a front elevation of my improved pipe thread cleaner, partly broken away and in section to facilitate illustration.
Figure 2:
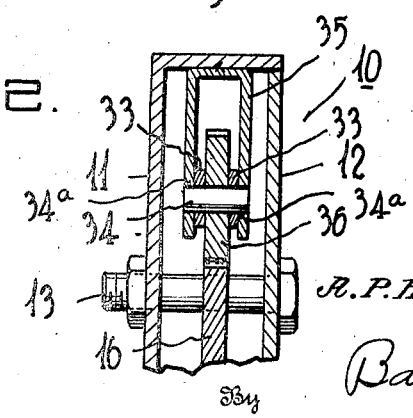
Fig. 2 is a radial sectional view of a detail, taken on the line 2—2 of Fig. 1.

Referring to the drawings, 10 designates a casing formed of sections 11 and 12 secured together by bolts 13. A bearing sleeve 14 projects from the section 12 and serves to support a rod 15 which is provided at its outer end with a relatively large central stationary gear 16 that is positioned within the casing. Any suitable means may be employed for clamping the gear 16 and its integral rod 15 in place. For example, I may use a set screw 17 that is threaded into the section 11 of the casing and holds the gear against a bearing washer 18 slidably engaging the section 12.

The rod is provided at its inner end with a cone or the like 19 which may be employed to facilitate the insertion of the rod in the pipe, and such cone may be secured to the rod by a threaded joint indicated at 20.

In order to secure the apparatus to pipes of various sizes, spring arms 21 having their inner ends secured to the rod at 22, and their outer ends provided with rollers 23 or the like, are adapted to engage the inner surface of the pipe 24 which has threads 25 that are to be cleaned. The spring arms cooperate with a wedge-shaped nut 26, engaging the threads 27 of the rod 15. When the rod is out of the pipe, it is obvious that the spring arms can be adjusted by turning the nut 26 so as to move it toward or away from the rollers 23, and in this way obtain the necessary adjustment of the rollers for proper engagement with the inner surface of the pipe when the rod is inserted into said pipe.

The shaft 15 forms a support about which the casing is rotated when a handle 28 (attached to the casing), is turned, and the casing carries one or more brushes 29 arranged to brush the threaded end 25 of the pipe. Each brush may be of substantially cylindrical form and mounted on a shaft 29a. In the preferred form of the invention, each of these shafts is rotatably mounted in an eccentric bearing 30 having a substantially U-shaped medial portion 31 arranged within the casing. Each shaft has a pinion 32 fixed thereto and accommodated within the U-shaped portion of the bearing. Links 33 connect each shaft 29a to an adjacent shaft 34 disposed in an oblong slot or recess 34a provided in a U-shaped bracket 35 that is fixed to the section 11 of the casing. The slot 34a provides for movement of the shaft 34 and the idler gear 32 with reference to the eccentric 31. Each bracket is of less width than the internal portion of the U-shaped part of the eccentric bearing, so that the bearing can be turned without interference by the bracket. Each shaft 34 supports a pinion 36 that meshes with the gear 16 and drives the pinion 32 as the casing is rotated about the stationary gear 16. Obviously, when the casing is rotated about the gear 16, the brushes will be rotated and thereby clean the threads 25.

In order to adjust the eccentric bearings 30 to move the shafts 29a toward or away from the axis of the gear 16, the bolts 13 are loosened and the eccentric bearings are turned to the proper points. Then the bolts are tightened to cause the sections 11 and 12 of the casing to clamp the bearings in their new positions.

Figure 6:
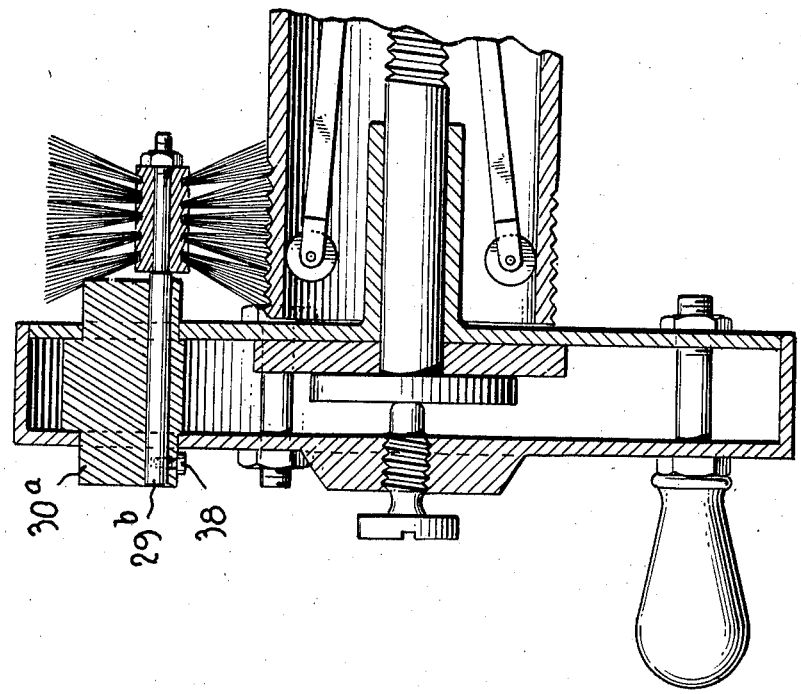
Fig. 6 is a sectional view of a detail, taken on a section through Fig. 5 similar to that indicated by the line 3—3 of Fig. 1.
Figure 5:
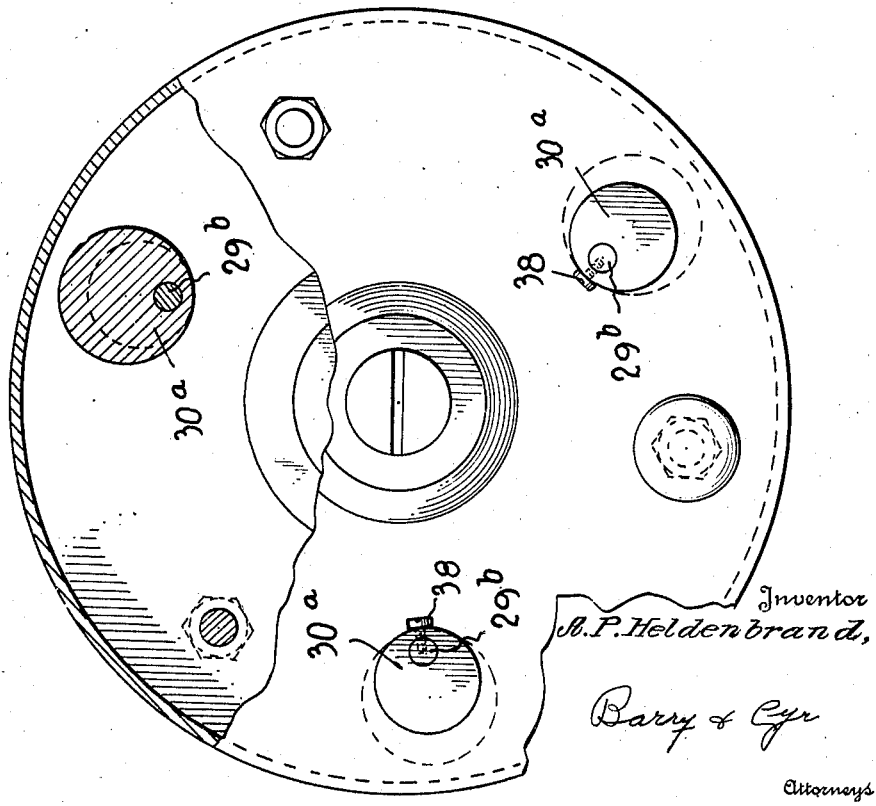
Fig. 5 is a view similar to Fig. 1, but illustrating a structure in which the brushes are stationary.

In some instances, I may use stationary brushes instead of rotatable ones, and in that event, I employ the construction shown in Figs. 5 and 6. In such a structure, it will be observed in connection with each brush shaft 29b, that the parts 32, 33, 34, 35 and 36 are eliminated, and the shaft 29b is locked in position by a set screw 38 carried by the eccentric bearing 30a. With such a structure, I can still obtain the above described adjustability, and when the casing is turned, the brushes will be caused to brush any dirt or the like from the threads of the pipe.

It will be apparent that the invention can be utilized for the cleaning of internal threads of a pipe as well as external threads. In such instances, especially pipe of large diameter, the brush 29 could be inserted into the pipe and be caused to rotate in a manner above described, it being understood that the plurality of brushes would have a tendency to support the structure in this operation.

While I have disclosed what I now consider to be preferred embodiments of my invention, I am aware that changes may be made in the details disclosed, without departing from the spirit of the invention, as expressed in the claims.

What I claim and desire to secure by Letters Patent is:

1. In a portable pipe thread cleaning apparatus of the character described, a supporting structure comprising a rod adapted to enter the end portion of a pipe having external threads, expansible and resilient means mounted on the rod and adapted to engage the inner surface of the pipe for securing the supporting structure to the pipe, means operatively connected with the rod for actuating the expansible and contractible means, rotatable means journaled on the supporting structure, for supporting a brush, said brush adapted to be rotated by the rotatable means for cleaning the external threads of the pipe.

2. A portable pipe thread cleaning apparatus comprising a supporting structure including means for securing the same to the interior of a threaded pipe, a stationary gear secured to the supporting structure, rotatable means journaled on the supporting structure and movable about the axis of said gear, a rotatable shaft carried by the rotatable means and provided with a pinion, a second pinion carried by rotatable means, said second pinion meshing with said gear and the first mentioned pinion, and a brush mounted on the shaft and rotatable therewith for cleaning the threads of the pipe.

3. In a pipe thread cleaning apparatus of the character described, supporting means having adjustable elements adapted to enter a pipe and to secure the supporting means in a stationary position, a casing rotatably mounted on the supporting means, a stationary gear arranged in the casing and having its axis coaxial with the axis of rotation of the casing, a rotatable shaft carried by the casing, means operatively connecting the shaft to the stationary gear to turn the shaft due to the turning movement of the casing, and a brush carried by said shaft and adapted to engage external threads of the pipe as the casing is rotated.

4. In a thread cleaner of the character described, a supporting structure comprising a rod adapted to enter a pipe, a plurality of resilient arms operatively connected to the rod and having rollers adapted to engage the inner surface of the pipe, an adjustable means on the rod for spreading the arms, rotatable means journalled on the supporting structure, a rotatable shaft carried by the rotatable means, and a brush disposed on the rotatable shaft for cleaning the threads of the pipe.

ARTHUR P. HELDENBRAND.